US012002403B1

(12) United States Patent
He

(10) Patent No.: US 12,002,403 B1
(45) Date of Patent: Jun. 4, 2024

(54) PIXEL ARRANGEMENT STRUCTURE AND DISPLAY PANEL

(71) Applicant: Shenzhen China Star Optoelectronics Semiconductor Display Technology Co., Ltd., Shenzhen (CN)

(72) Inventor: Jhenwei He, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/309,813

(22) Filed: Apr. 30, 2023

(30) Foreign Application Priority Data

Dec. 26, 2022 (CN) ........................ 202211679154.9

(51) Int. Cl.
*G09G 3/20* (2006.01)

(52) U.S. Cl.
CPC ... *G09G 3/2074* (2013.01); *G09G 2300/0452* (2013.01); *G09G 2300/0465* (2013.01); *G09G 2320/0233* (2013.01); *G09G 2320/0242* (2013.01); *G09G 2320/08* (2013.01)

(58) Field of Classification Search
CPC ......... G09G 3/2074; G09G 2300/0452; G09G 2300/0465; G09G 2320/0233; G09G 2320/0242; G09G 2320/08
USPC .......................................................... 345/694
See application file for complete search history.

(56) References Cited

U.S. PATENT DOCUMENTS

2015/0146126 A1* 5/2015 Shin .................. G02F 1/133345 349/43
2022/0121073 A1* 4/2022 Zhang ............... G02F 1/136286

* cited by examiner

*Primary Examiner* — Amare Mengistu
*Assistant Examiner* — Gloryvid Figueroa-Gibson
(74) *Attorney, Agent, or Firm* — Nathan & Associates; Menachem Nathan

(57) ABSTRACT

A pixel arrangement structure and a display panel are provided by the present disclosure. The pixel arrangement structure includes at least one pixel group, and the pixel group includes a plurality of sub-pixels arranged in an array. In the pixel group, a ratio of a number of high-grayscale subpixels to a number of low-grayscale subpixels is 1:2 or 1:3. The low-grayscale subpixels include a plurality of first low-grayscale subpixels, and among adjacent N rows of the subpixels, the number of the high-grayscale subpixels equals to a number of the first low-grayscale subpixels, and N is an integral multiple of 2, an integral multiple of 3, or 1.

20 Claims, 7 Drawing Sheets

PIXEL ARRANGEMENT STRUCTURE AND DISPLAY PANEL

TECHNICAL FIELD

The present disclosure relates to the technical field of displays, in particular to a pixel arrangement structure and a display panel.

BACKGROUND

With the development of display technologies, resolution of display panels is also gradually improved. At present, resolution of display panels has been raised to more than 8K (7680*4320). In display panels with fixed sizes, increasing in resolution will lead to reduction of aperture ratio, thereby reducing transmittance of display panels. Therefore, 8-Domains pixels aiming to improve viewing angle cannot be applied to products of relative high resolution due to transmittance loss. Then 4-Domains pixels are applied instead, which leads to deterioration of display characteristics and color variation in big viewing angles.

In this regard, an original grayscale of each of sub-pixels in an active display area of a display panel is replaced by a relative high grayscale and a relative low grayscale. When the display panel is observed from a side viewing angle, since the low-grayscale subpixels reduce brightness changes in side viewing angles, the more the low-grayscale subpixels, the better the improvement of color variation. However, increasing in number of the low-grayscale pixels affects clarity of images, resulting in graininess of images.

SUMMARY

A pixel arrangement structure and a display panel are provided according to the disclosure to solve the technical problem that increasing number of low-gray subpixels affects the clarity of images and induces graininess.

A pixel arrangement structure provided according to the disclosure includes at least one pixel group, wherein the pixel group includes a plurality of sub-pixels arranged in an array, in the pixel group, a ratio of a number of high-grayscale subpixels to a number of low-grayscale subpixels is 1:2 or 1:3, the low-grayscale subpixels include a plurality of first low-grayscale subpixels, among each adjacent N rows of the subpixels, the number of the high-grayscale subpixels equals to a number of the first low-grayscale subpixels, where N is an integer multiple of 2, an integer multiple of 3, or 1.

Optionally, in some embodiments of the present application, in the pixel group, a ratio of the number of the high-grayscale subpixels to the number of the low-grayscale subpixels is 1:2, and the low-grayscale subpixels further include a plurality of second low-grayscale subpixels, in adjacent N rows of the subpixels, the number of the high-grayscale subpixels, the number of the first low-grayscale subpixels, and a number of the second low-grayscale subpixels are equal.

Optionally, in some embodiments of the present application, in each column of the pixel group, the number of the high-grayscale subpixels, the number of the first low-grayscale subpixels, and the numbers of the second low-grayscale subpixels are equal.

Optionally, in some embodiments of the present application, the sub-pixels in the pixel group are arranged in three rows and nine columns, in each of the three rows, the number of the high-grayscale subpixels, the number of the first low-grayscale subpixels, and the number of the second low-grayscale subpixels are equal.

Optionally, in some embodiments of the present application, each of the three rows of the pixel group includes a first pixel unit, a second pixel unit, and a third pixel unit, the first pixel unit includes one of the high-grayscale subpixels, one of the first low-grayscale subpixels, and another one of the high-grayscale subpixels arranged sequentially along a row direction, the second pixel unit includes one of the first low-grayscale subpixels, one of the second low-grayscale subpixels, and another one of the first low-grayscale subpixels arranged sequentially along the row direction, and the third pixel unit includes one of the second low-grayscale subpixels, one of the high-grayscale subpixels, and another one of the second low-grayscale subpixels arranged sequentially along the row direction;

each of the three rows of the pixel group includes a first pixel unit, a second pixel unit, and a third pixel unit.

Optionally, in some embodiments of the present application, the first pixel unit includes three of the high-grayscale subpixels arranged sequentially along a row direction, the second pixel unit includes three of the first low-grayscale subpixels arranged sequentially along the row direction, and the third pixel unit includes three of the second low-grayscale subpixels arranged sequentially along the row direction.

Optionally, in some embodiments of the present application, each of the three rows of the pixel group includes a first pixel unit, a second pixel unit, and a third pixel unit; the first pixel unit includes one of the high-grayscale subpixels, one of the first low-grayscale subpixels, and one of the second low-grayscale subpixels arranged sequentially along a row direction, the second pixel unit includes one of the first low-grayscale subpixels, one of the second low-grayscale subpixels, and one of the high-grayscale subpixels arranged sequentially along the row direction, and the third pixel unit includes one of the second low-grayscale subpixels, one of the high-grayscale subpixels, and one of the first low-grayscale subpixels arranged sequentially along the row direction.

Optionally, in some embodiments of the present application, the sub-pixels in the pixel group are arranged in three rows and twelve columns, in one of the three rows of the sub-pixels, the second low-grayscale subpixels and the high-grayscale subpixels alternately arranged, in other two rows of the sub-pixels, the number of the high-grayscale subpixels equals to the number of the second low-grayscale subpixels.

Optionally, in some embodiments of the present application, the pixel group includes a plurality of first pixel units and a plurality of second pixel units, each of the first pixel units and the second pixel units is arranged in one row and six columns, in the first pixel unit, the high-grayscale subpixels and the first low-grayscale subpixels are alternately arranged, and in the second pixel unit, the first low-grayscale subpixels and the second low-grayscale subpixels are alternately arranged;

a first row of the three rows includes the first pixel units and the second pixel units arranged sequentially along a row direction; in a second row of the three rows, the second low-grayscale subpixels and the high-grayscale subpixels are alternately arranged, and a third row of the three rows includes the second pixel units and the first pixel units sequentially along the row direction.

Optionally, in some embodiments of the present application, for a same original gray scale, grayscale values of the high-grayscale subpixels are greater than grayscale values of the first low-grayscale subpixels, the grayscale values of the first low-grayscale subpixels are greater than grayscale values of the second low-grayscale subpixels.

Optionally, in some embodiments of the present application, in the pixel group, the ratio of the number of the high-grayscale subpixels to the number of the low-grayscale subpixels is 1:3, and the low-grayscale subpixels further includes a plurality of second low-grayscale subpixels and a plurality of third low-grayscale subpixels, in adjacent N rows of the subpixels, the number of the high-grayscale subpixels, the number of the first low-grayscale subpixels, the number of the second low-grayscale subpixels, and the number of the third low-grayscale subpixels are equal.

Optionally, in some embodiments of the present application, in every two adjacent rows in the pixel group, the number of the high-grayscale subpixels, the number of the first low-grayscale subpixels, the number of the second low-grayscale subpixels, and the number of the third low-grayscale subpixels are equal, in each column of the sub-pixels, the number of the high-grayscale subpixels, the number of the first low-grayscale subpixels, the number of the second low-grayscale subpixels, and the number of the third low-grayscale subpixels are equal.

Optionally, in some embodiments of the present application, the pixel group includes a first pixel unit, a second pixel unit, a third pixel unit, and a fourth pixel unit, the first pixel unit includes two of the high-grayscale subpixels and one of the first low-grayscale subpixels; the second pixel unit includes one of the high-grayscale subpixels and two of the first low-grayscale subpixels; the third pixel unit includes two of the second low-grayscale subpixels and one of the third low-grayscale subpixels; and the fourth pixel unit includes one of the second low-grayscale subpixels and two of the third low-grayscale subpixels, in the pixel group, the first pixel unit and the second pixel unit are arranged diagonally, and the third pixel unit and the fourth pixel unit are arranged diagonally.

Optionally, in some embodiments of the present application, in each row in the pixel group, the number of the high-grayscale subpixels, the number of the first low-grayscale subpixels, the number of the second low-grayscale subpixels, and the number of the third low-grayscale subpixels are equal, in every six adjacent columns, the number of the high-grayscale subpixels, the number of the first low-grayscale subpixels, the number of the second low-grayscale subpixels, and the number of the third low-grayscale subpixels are equal.

Optionally, in some embodiments of the present application, the pixel group includes a plurality of first pixel units and a plurality of second pixel units, each of the first pixel units and the second pixel units is arranged in one row and six columns, in the first pixel unit, the high-grayscale subpixels and the first low-grayscale subpixels are alternately arranged, in the second pixel unit, the second low-grayscale subpixels and the third low-grayscale subpixels are alternately arranged, in a same row of the pixel group, the first pixel units and the second pixel units are alternately arranged, and in a same column of the pixel group, the first pixel units and the second pixel units are alternately arranged.

Optionally, in some embodiments of the present application, for a same original gray scale, grayscale values of the high-grayscale subpixels are greater than grayscale values of the first low-grayscale subpixels, the grayscale values of the first low-grayscale subpixels are greater than grayscale values of the second low-grayscale subpixels, the grayscale values of the second low-grayscale subpixels are greater than grayscale values of the third low-grayscale subpixels.

Optionally, in some embodiments of the present application, in the pixel group, the sub-pixels in a same column are in a same color, and the sub-pixels in a same row are arranged by repeating any combination of a red sub-pixel, a green sub-pixel, a blue sub-pixel.

Optionally, in some embodiments of the present application, the pixel unit includes a plurality of pixel units, each of which including a red sub-pixel, a green sub-pixel, and a blue sub-pixel.

A display panel is also provided by the disclosure, which includes the pixel arrangement structure above-mentioned.

The present disclosure provides a pixel arrangement structure and display panel. In pixel arrangement structure provided by present disclosure, since a ratio of a number of high-grayscale subpixels to a number of low-grayscale subpixels is 1:2 or 1:3, the number of low-gray subpixel increases, which can further enhance the viewing angle color variation compensation. Furthermore, in pixel group, since the number of the high-grayscale subpixels equals to a number of the first low-grayscale subpixels, display brightness in every adjacent N rows of the sub-pixels in the pixel group become more uniform, thus alleviating the graininess of images and improving visual effect while enhancing viewing angel compensation.

BRIEF DESCRIPTION OF THE DRAWINGS

In order to more clearly explain the technology solutions in present disclosure, drawings that need to be used in the description of embodiments will be briefly introduced below. Obviously, the drawings in the following description are only some embodiment of the present disclosure. For those skilled in the art, other figures can be obtained from these figures without inventive step labor.

DETAILED DESCRIPTION OF THE EMBODIMENT

The following describes the technical solutions of the embodiments of the present application in a clear and complete manner with reference to the accompanying drawings in the embodiments of the present disclosure. It will be apparent that the described embodiments are only a part of the embodiments of the present disclosure, but not all of the embodiments. Based on embodiment in present disclosure, all other embodiment acquired by those skilled in the art without inventive step work, all belong to the protection scope of present disclosure.

In the description of the present disclosure, it should be understood that the terms "first" and "second" are used for description purposes only, and cannot be interpreted as indications or implication of the importance of technical features or implicitly indicating the number of technical features. Thus, features defined with "first" and "second" or the like, may expressly or implicitly implies that one or more of the features described are included, so it should not be understood as a limitation of the present disclosure. Also, the term "a plurality of" refers to two or more.

The present disclosure provides a pixel arrangement structure and a display panel, which are described in detail below. It should be noted that the order of description of the following embodiments should not be taken as a limitation as a preferred level of the embodiments of the present disclosure.

Figure 1:
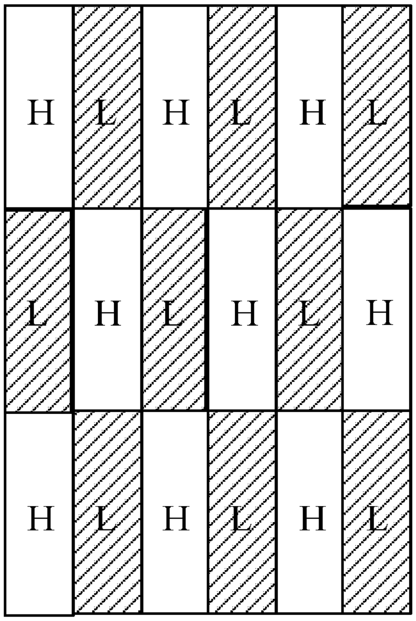
FIG. 1 is a schematic diagram of a structure of a pixel arrangement according to the present disclosure.
Figure 2:
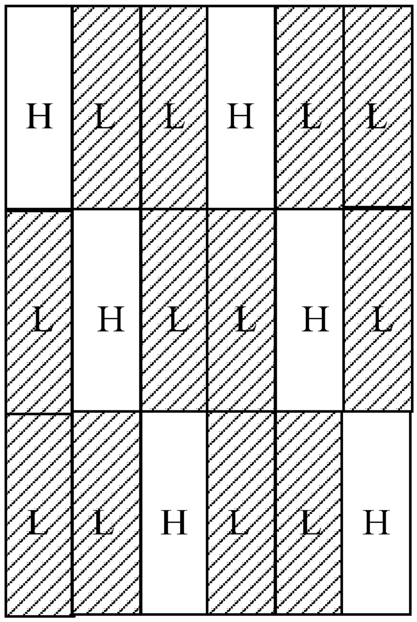
FIG. 2 is a schematic diagram of another structure of the pixel arrangement according to the present disclosure.
Figure 3:
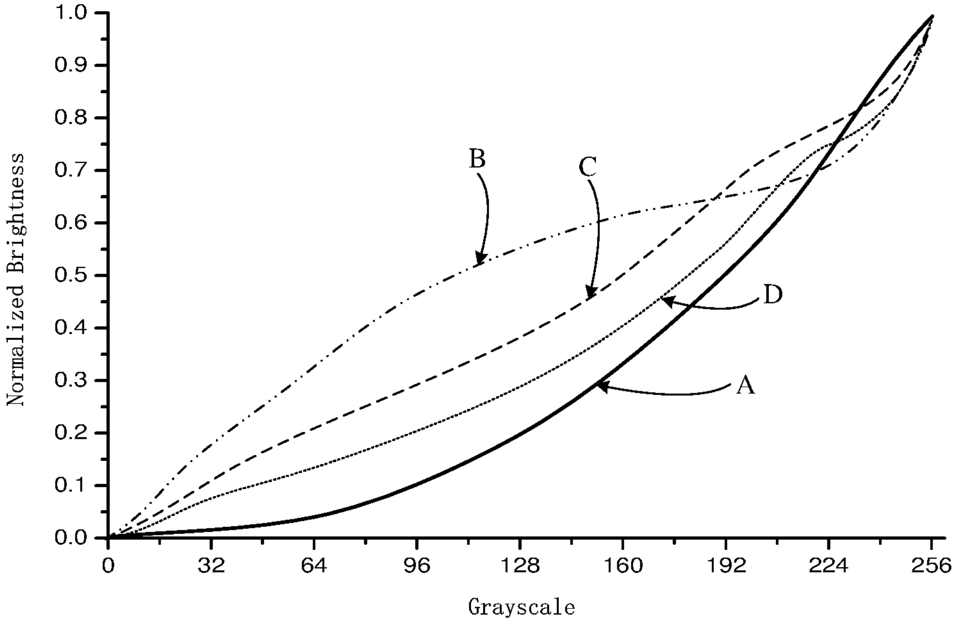
FIG. 3 is a schematic diagram of gamma curves before and after color variation improvement according to the present disclosure.

Specifically, referring to FIG. 1 to FIG. 3, FIG. 1 is a schematic diagram of a structure of a pixel arrangement according to the present disclosure. FIG. 2 is a schematic diagram of another structure of the pixel arrangement according to the present disclosure. FIG. 3 is a schematic diagram of gamma curves before and after color variation improvement according to the present disclosure.

As shown in FIG. 1, a display panel displays images with a plurality of high-grayscale subpixels H and a plurality of low-grayscale subpixels L. A ratio of a number of the high-grayscale subpixels H to a number of the low-grayscale subpixels L is 1:1, that is, H:L=1:1.

As shown in FIG. 2, a display panels displays images with a plurality of high-grayscale subpixels H and a plurality of low-grayscale subpixels L. A ratio of a number of the high-grayscale subpixels H to a number of the low-grayscale subpixels L is 1:2, that is, H:L=1:2.

It should be noted that if image display data of 8 bits in binary is input to the display panels, 28 original brightness grayscales from the darkest to the brightest are generated. That is, 256 brightness grayscales different to each other are generated (for example, recorded as the 0th grayscale to the 255th grayscale). Then any grayscale from the 0th gray scale to the 255th gray scale can be called an original gray scale. Each original grayscale corresponds to a high grayscale and a low grayscale. A grayscale value of the high gray scale is greater than or equals to a grayscale value of the original gray scale, and a grayscale value of the low gray scale is less than or equals to the grayscale value of the original gray scale.

In the present disclosure, a high-grayscale subpixel refers to a sub-pixel displays images in the high grayscale corresponding to the original gray scale, and a low-grayscale subpixel refers to a sub-pixel displays images in the low grayscale corresponding to the original gray scale. Among them, the term "grayscale" refers to the brightness level of the sub-pixel when powered on. That is to say, the pixel arrangement structure according to the present disclosure refers to the pixel arrangement structure in a powered on state.

As shown in FIG. 3, the curve A represents an initial front view gamma curve, that is, a front view gamma curve that has not been applied with viewing angle color variation compensation. The curve B represents an initial side view gamma curve, that is, a side view gamma curve that has not been applied with viewing angle color variation compensation. The curve C refers to a side view gamma curve when H:L=1:1. The curve D refers to a side view gamma curve when H:L=1:2. It can be seen that the higher the proportion of the low-grayscale subpixels L, the smaller the difference between side view brightness and front view brightness, and the better the improvement of color variation. But if it is desired to further enhance the viewing angle color variation compensation, more low-grayscale subpixels L are required, graininess of images may be obvious and may be noticed by viewers, thus lowering display quality.

In regard of this, the present disclosure provides a new pixel arrangement structure. The pixel arrangement structure includes at least one pixel group. The pixel group includes a plurality of sub-pixels arranged in an array. In the pixel group, a ratio of a number of high-grayscale subpixels to a number of low-grayscale subpixels is 1:2 or 1:3. The low-grayscale subpixels includes a plurality of first low-grayscale subpixels. Among each adjacent N rows of the sub-pixels, the number of the high-grayscale subpixels equals to a number of the first low-grayscale subpixels. N is an integer multiple of 2, an integer multiple of 3, or 1.

In embodiments of the present disclosure, on one hand, since the ratio of the number of the high-grayscale subpixels to the number of the low-grayscale subpixels is 1:2 or 1:3, by increasing the number of the low-grayscale subpixels, viewing angle compensation can be further enhanced. On the other hand, in the pixel group, since the number of the high-grayscale subpixels equals to a number of the first low-grayscale subpixels, display brightness in every adjacent N rows of the sub-pixels in the pixel group become more uniform, thus alleviating the graininess of images and improving visual effect while enhancing viewing angel compensation.

It is to be noted that the orientation or positional relationship indicated by terms "row", "column", "row direction", and "column direction" described in embodiments of the present disclosure is based on the orientation or positional relationship shown in the drawings, and is only for the convenience of describing the present disclosure and simplifying description, and cannot be understood as limitation to the present disclosure.

In the embodiments of the present disclosure, the sub-pixel 101 may be a red sub-pixel, a blue sub-pixel, a green sub-pixel, a yellow sub-pixel, or the like. For example, in some embodiments, in the pixel group 10, the sub-pixels 101 in a same column are in a same color, and the sub-pixels 101 in a same row are arranged by repeating any combination of a red sub-pixel, a green sub-pixel, a blue sub-pixel. For another example, each of the pixel units in each embodiment of the present disclosure described below includes a red sub-pixel, a green sub-pixel, and a blue sub-pixel. Certainly, the present disclosure are not limited to this.

Figure 4:
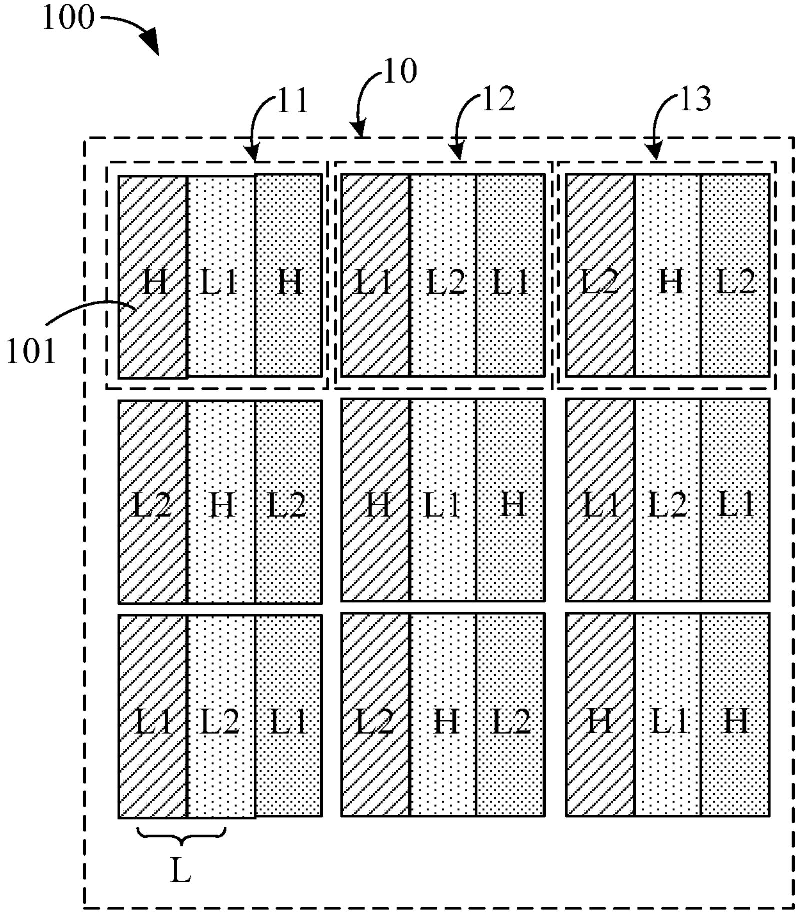
FIG. 4 is a schematic diagram of a first structure of the pixel arrangement structure according to the present disclosure.

Specifically, referring to FIG. 4, FIG. 4 is a schematic diagram of a first structure of the pixel arrangement structure according to the present disclosure. In embodiments of the present disclosure, the ratio of the number of the high-grayscale subpixels H to the number of the low-grayscale subpixels L is 1:2. The low-grayscale subpixels L include a plurality of first low-grayscale subpixels L1 and a plurality of second low-grayscale subpixels L2. In every adjacent N rows of the sub-pixels 101, the number of the high-grayscale subpixels H, the number of the first low-grayscale subpixels L1, and the number of the second low-grayscale subpixels L2 are equal.

It can be understood that according to embodiments of the present disclosure, one relatively high grayscale and two relatively low grayscales (namely, the high-grayscale subpixel H, the first low-grayscale subpixel L1, and the second low-grayscale subpixel L2) are applied to replace one original grayscale, and the difference between the relatively high grayscale and the relatively low grayscale is further increased, which further enhances viewing angle compensation. In addition, since the number of the high-grayscale subpixels H, the number of the first low-grayscale subpixels L1, and the number of the second low-grayscale subpixels L2 in every adjacent N rows of sub-pixels 101 are equal, display brightness of the pixel group 10 is more uniform, thus alleviating the graininess of images and improving visual effect while enhancing viewing angel compensation.

In embodiments of the present disclosure, for a same original grayscale, grayscale values of the high-grayscale subpixels H, grayscale values of the first low-grayscale subpixels L1, and grayscale values of the second low-grayscale subpixels L2 are different. For example, for a same original grayscale, the grayscale values of the high-grayscale subpixels H are greater than the grayscale values of the first low-grayscale subpixels L1, the grayscale values of the first low-grayscale subpixels L1 are greater than the grayscale values of the second low-grayscale subpixels L2.

In some embodiments, in each column of the subpixels 101 in the pixel group 10, the number of the high-grayscale subpixels H, the number of the first low-grayscale subpixels L1 and the number of the second low-grayscale subpixels L2 are equal. Thus, the high-grayscale subpixels H, the first low-grayscale subpixels L1, and the second low-grayscale subpixels L2 are arranged more uniformly in each column, thereby improving the uniformity of display brightness of adjacent columns and alleviating the graininess of images.

In some embodiment s, the plurality of sub-pixels 101 in the pixel group 10 are arranged in three rows and nine columns. In each row of the sub-pixels 101, the number of the high-grayscale subpixels H, the number of the first low-grayscale subpixels L1, and the number of the second low-grayscale subpixels L2 are equal.

Specifically, referring to FIG. 4, the pixel group 10 includes a first pixel unit 11, a second pixel unit 12, and a third pixel unit 13. The first pixel unit 11 includes one high-grayscale subpixel H, one first low-grayscale subpixel L1, and another high-grayscale subpixel H arranged sequentially along a row direction. The second pixel unit 12 includes one first low-grayscale subpixel L1, one second low-grayscale subpixel L2, and another first low-grayscale subpixel L1 arranged sequentially along the row direction. The third pixel unit 13 includes one second low-grayscale subpixel L2, one high-grayscale subpixel H, and another second low-grayscale subpixel L2 arranged sequentially along the row direction. Each row of the sub-pixels 101 includes the first pixel unit 11, the second pixel unit 12, and third pixel unit 13.

For example, as shown in FIG. 4, in the pixel group 10, the first row of the sub-pixels 101*s* includes the first pixel unit 11, the second pixel unit 12, and the third pixel unit 13 arranged sequentially along the row direction. The second row of the sub-pixels 101 includes the third pixel unit 13, the first pixel unit 11, and the second pixel unit 12 arranged sequentially along the row direction. The third row of the sub-pixels 101 includes the second pixel unit 12, the third pixel unit 13, and the first pixel unit 11 arranged sequentially along the row direction.

For example, in other embodiments, in pixel group 10, the first row of the sub-pixels 101 includes the first pixel unit 11, the second pixel unit 12, and the third pixel unit 13 arranged sequentially along the row direction. The second row of the sub-pixels 101 includes the second pixel unit 12, the third pixel unit 13, and the first pixel unit 11 arranged sequentially along the row direction. The third row of the sub-pixels 101 includes the third pixel unit 13, the first pixel unit 11, and the second pixel unit 12 arranged sequentially along the row direction.

Further, in the pixel group 10, the sub-pixels 101 in a same column are in a same color, and the sub-pixels 101 in a same row are arranged by repeating any combination of a red sub-pixel, a green sub-pixel, a blue sub-pixel. Then in each row or column of the sub-pixels 101, the numbers of the high-grayscale subpixels H, the numbers of the first low-grayscale subpixels L1, and the numbers of the second low-grayscale subpixels L2 corresponding to the red sub-pixels equal to each other. In each row or column of the sub-pixels 101, the numbers of the high-grayscale subpixels H, the numbers of the first low-grayscale subpixels L1, and the numbers of the second low-grayscale subpixels L2 corresponding to green sub-pixels equals to each other. In each row or column of sub-pixels 101, the numbers of the high-grayscale subpixels H, the numbers of the first low-grayscale subpixels L1, and the numbers of the second low-grayscale subpixels L2 corresponding to blue sub-pixels equals to each other. Therefore, in the embodiment, the high-grayscale subpixels H, the first low-grayscale sub-pixels L1, and the second low-grayscale subpixels L2 corresponding to the red sub-pixels, the green sub-pixels, and the blue sub-pixels are distributed more uniformly, so that chromaticity uniformity can be obtained.

Figure 5:
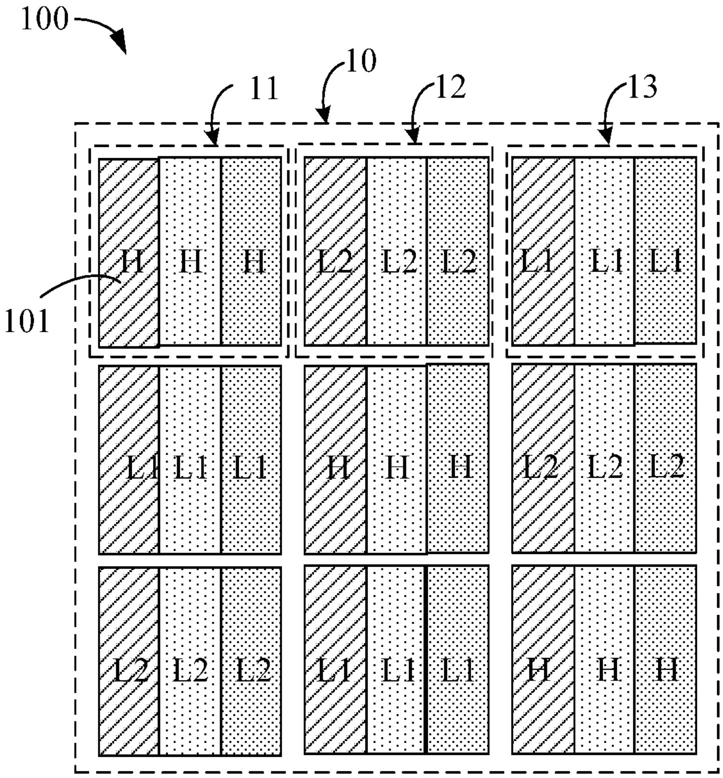
FIG. 5 is a schematic diagram of a second structure of the pixel arrangement structure according to the present disclosure.

Referring to FIG. 5, FIG. 5 is a schematic diagram of a second structure of the pixel arrangement structure according to the present disclosure. Difference from the pixel arrangement structure 100 shown in FIG. 4 lies in that in the embodiment of FIG. 5, the first pixel unit 11 includes three high-grayscale subpixels H arranged sequentially along the row direction. The second pixel unit 12 includes three first low-grayscale subpixels L1 arranged sequentially along the row direction. The third pixel unit 13 includes three second low-grayscale subpixels L2 arranged sequentially along the row direction. Each row of the sub-pixels 101 includes the first pixel unit 11, the second pixel unit 12, and the third pixel unit 13.

For example, in the pixel group 10, the first row of the sub-pixels 101 includes the first pixel unit 11, the second pixel unit 12, and the third pixel unit 13 arranged sequentially along the row direction. The second row of the sub-pixels 101 includes the third pixel unit 13, the first pixel unit 11, and the second pixel unit 12 arranged sequentially along the row direction. The third row of the sub-pixels 101 includes the second pixel unit 12, the third pixel unit 13, and the first pixel unit 11 arranged sequentially along the row direction.

For another example, in the pixel group 10, the first row of the sub-pixels 101 includes the first pixel unit 11, the second pixel unit 12, and the third pixel unit 13 arranged sequentially along the row direction. The second row of the sub-pixels 101 includes the second pixel unit 12, the third pixel unit 13, and the first pixel unit 11 arranged sequentially along the row direction. The third row of the sub-pixels 101 includes the third pixel unit 13, the first pixel unit 11, and the second pixel unit 12 arranged sequentially along the row direction.

Further, in the pixel group 10, the sub-pixels 101 in a same column are in a same color, and the sub-pixels 101 in a same row are arranged by repeating any combination of a red sub-pixel, a green sub-pixel, a blue sub-pixel. Then in each row or column of the sub-pixels 101, the numbers of the high-grayscale subpixels H, the numbers of the first low-grayscale subpixels L1, and the numbers of the second low-grayscale subpixels L2 corresponding to the red sub-pixels are same. Therefore, in the embodiment, the distribution of the high-grayscale subpixels H, the first low-grayscale subpixels L1, and the second low-grayscale subpixels L2 corresponding to the red sub-pixels is more uniform, so that chromaticity uniformity can be obtained. It is the same for the blue sub-pixels and the green sub-pixels, which will not be repeated here.

Figure 6:
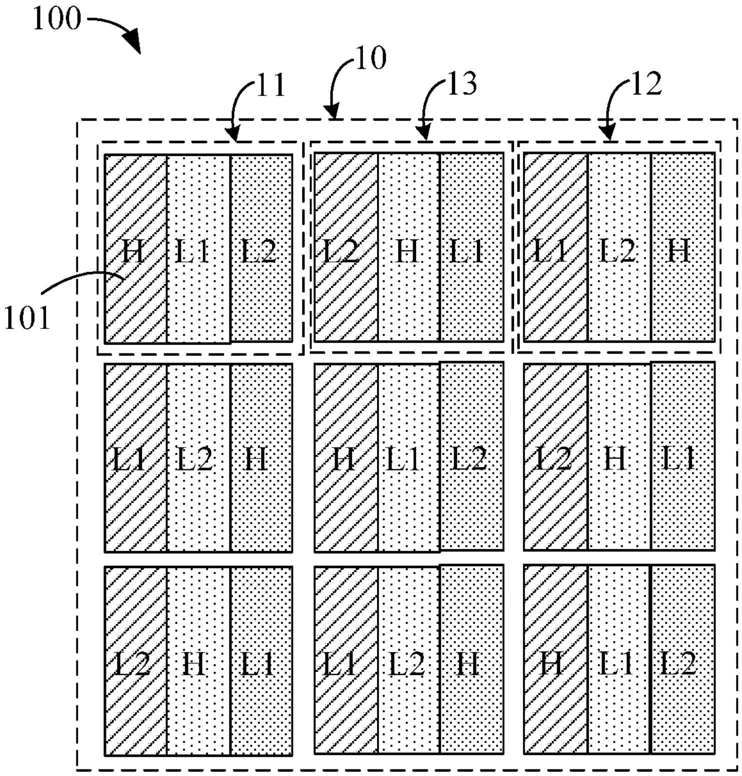
FIG. 6 is a schematic diagram of a third structure of the pixel arrangement structure according to the present disclosure.

Referring to FIG. 6, FIG. 6 is a schematic diagram of a third structure of the pixel arrangement structure according to the present disclosure. Difference from the pixel arrangement structure 100 shown in FIG. 4 lies in that in the embodiment of FIG. 6, the first pixel unit 11 includes one high-grayscale subpixel H, one first low-grayscale subpixel L1, and one second low-grayscale subpixel L2 arranged sequentially along the row direction. The second pixel unit 12 includes one first low-grayscale subpixel L1, one second low-grayscale subpixel L2, and a high-grayscale subpixel H arranged sequentially along the row direction. The third pixel unit 13 includes is along one second low-grayscale subpixel L2, a high-grayscale subpixel H and one first low-grayscale subpixel L1 arranged sequentially along the row direction. Each row of the sub-pixels 101 includes the first pixel unit 11, the second pixel unit 12, and the third pixel unit 13.

For example, in the pixel group 10, the first row of the sub-pixels 101 includes the first pixel unit 11, the second pixel unit 12, and the third pixel unit 13 arranged sequentially along the row direction. The second row of the sub-pixels 101 includes the second pixel unit 12, the third pixel unit 13, and the first pixel unit 11 arranged sequentially along the row direction. The third row of the sub-pixels 101 includes the third pixel unit 13, the first pixel unit 11, and the second pixel unit 12 arranged sequentially along the row direction.

For another example, in the pixel group 10, the first row of the sub-pixels 101 includes the first pixel unit 11, the second pixel unit 12, and the third pixel unit 13 arranged sequentially along the row direction. The second row of the sub-pixels 101 includes the third pixel unit 13, the first pixel unit 11, and the second pixel unit 12 arranged sequentially along the row direction. The third row of the sub-pixels 101 includes the second pixel unit 12, the third pixel unit 13, and the first pixel unit 11 arranged sequentially along the row direction.

Furthermore, in the pixel group 10, the sub-pixels 101 in a same column are in a same color, and the sub-pixels 101 in a same row are arranged by repeating any combination of a red sub-pixel, a green sub-pixel, a blue sub-pixel. Then in each row or column of the sub-pixels 101, the numbers of the high-grayscale subpixels H, the numbers of the first low-grayscale subpixels L1, and the numbers of the second low-grayscale subpixels L2 corresponding to the red sub-pixels equal to each other. Therefore, in the embodiment, the distribution of the high-grayscale subpixels H, the first low-grayscale subpixels L1, and the second low-grayscale subpixels L2 corresponding to the red sub-pixels is more uniform, so that chromaticity uniformity can be obtained. It is the same for the blue sub-pixels and the green sub-pixels, which will not be repeated here.

Figure 7:
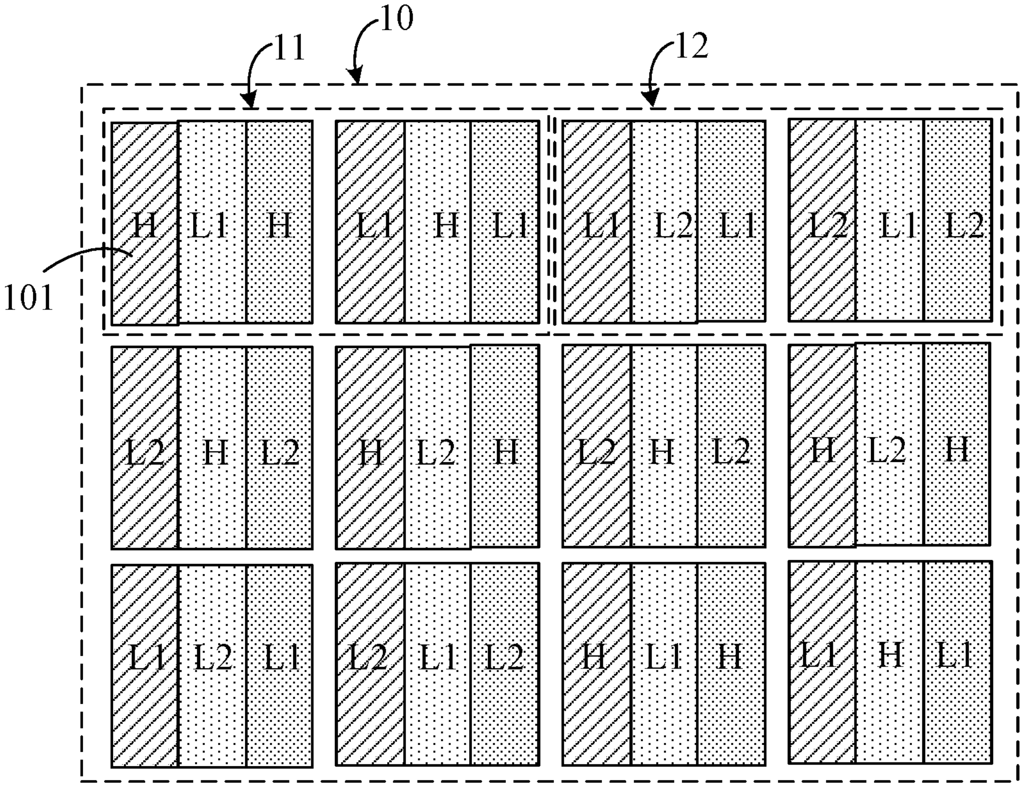
FIG. 7 is a schematic diagram of a fourth structure of the pixel arrangement structure according to the present disclosure.

Referring to FIG. 7, FIG. 7 is a schematic diagram of a fourth structure of the pixel arrangement structure according to the present disclosure. Difference from the pixel arrangement structure 100 shown in FIG. 4 lies in that in the embodiment of FIG. 7, the sub-pixels 101 in the pixel group 10 are arranged in three rows and twelve columns. In one row of the sub-pixels 101, the second low-grayscale subpixels L2 and high-grayscale subpixels H are alternately arranged. In the other two rows of the sub-pixels 101, the number of the high-grayscale subpixels H equals to the number of the second low-grayscale subpixels L2.

It can be understood that for a same original gray scale, grayscale values of the high-grayscale subpixels H are greater than grayscale values of the first low-grayscale subpixels L1, the grayscale values of the first low-grayscale subpixels L1 are greater than grayscale values of the second low-grayscale subpixels L2. That is, for the same original gray scale, brightness of the high-grayscale subpixels H are greater than brightness of the first low-grayscale subpixels L1; and the brightness of the first low-grayscale subpixels L1 are greater than brightness of the second low-grayscale subpixels L2. Therefore, in one row of the sub-pixels 101, the second low-grayscale subpixels L2 and the high-grayscale subpixels H are alternately arranged, and in the other two rows of the sub-pixels 101, the number of the high-grayscale subpixels H equals to the number of the second low-grayscale subpixels L2. Different grayscales brightness neutralize with each other, thereby improving the uniformity of brightness of the subpixels 101 and alleviating the graininess of images.

Specifically, as shown in FIG. 7, the pixel group 10 includes a plurality of first pixel units 11 and a plurality of second pixel units 12. Each of the first pixel unit 11 and the second pixel unit 12 are arranged in one row and six columns. In the first pixel unit 11, the high-grayscale subpixels H and the first low-grayscale subpixels L1 are alternately arranged. In the second pixel unit 12, the first low-grayscale subpixels L1 and the second low-grayscale subpixels L2 are alternately arranged.

The first row of the sub-pixels 101 includes the first pixel units 11 and the second pixel units 12 arranged sequentially along the row direction. In the second row of the sub-pixels 101, the second low-grayscale subpixels L2 and the high-grayscale subpixels H are alternately arranged. The third row of sub-pixels 101 includes the second pixel unit 12 and the first pixel unit 11 arranged sequentially along the row direction.

In the embodiment of the present disclosure, the number of the high-grayscale subpixels H in the first row equals to the number of the high-grayscale subpixels H located in the third row. The number of the first low-grayscale subpixels L1 in the first row equals to the number of the first low-grayscale subpixels L1 in the third row. The number of the second low-grayscale subpixels L2 in the first row equals to the number of the second low-grayscale subpixels L2 in the third row. That is, in the first row of the sub-pixels 101 and the third row of the sub-pixels 101, the high-grayscale subpixels H, the first low-grayscale subpixels L1, and the second low-grayscale subpixels L2 are distributed more uniformly, further improving the uniformity of brightness of the pixel group 10 and alleviating the graininess of images.

Figure 8:
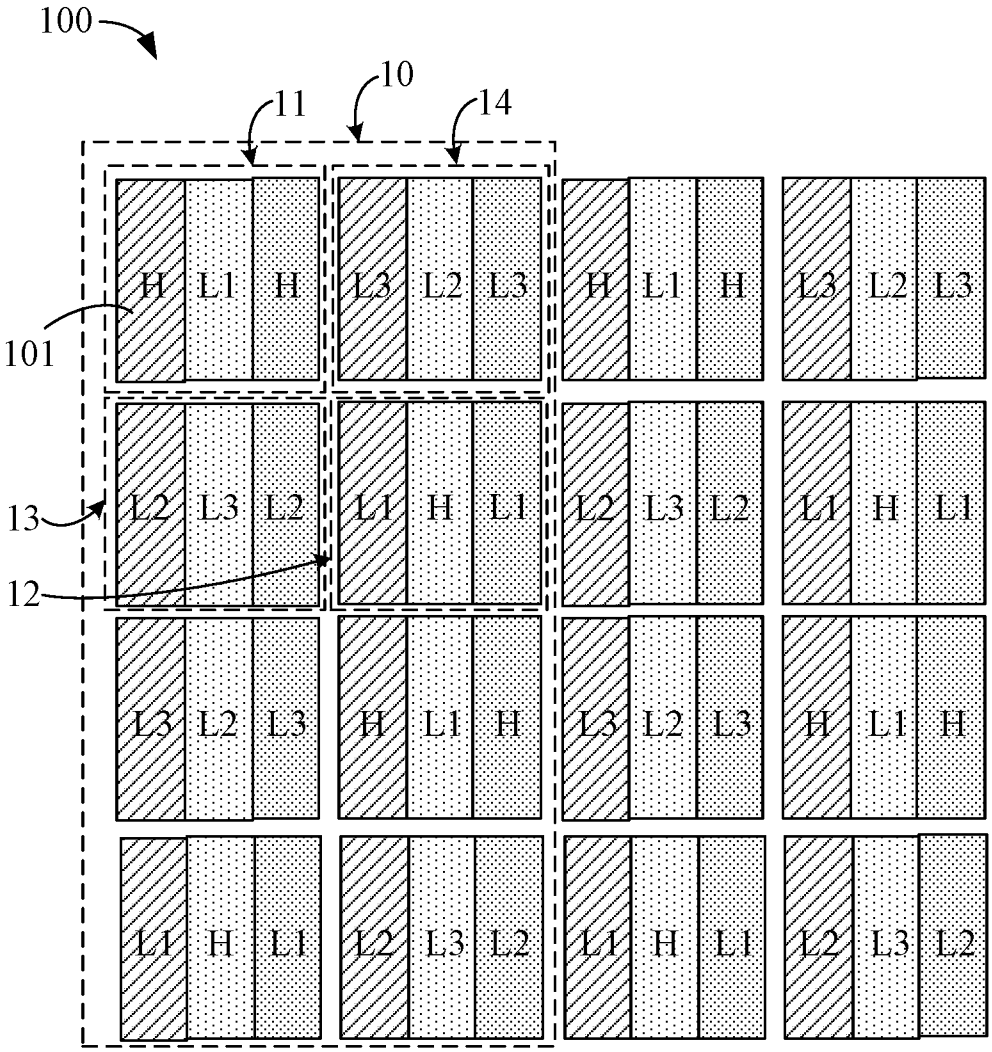
FIG. 8 is a schematic diagram of a fifth structure of the pixel arrangement structure according to the present disclosure.

Referring to FIG. 8, FIG. 8 is a schematic diagram of a fifth structure of the pixel arrangement structure according to the present disclosure. Difference from the pixel arrangement structure 100 shown in FIG. 1 lies in that in the embodiment of FIG. 8, the ratio of the number of the high-grayscale subpixels H to the number of the low-grayscale subpixels L in the pixel group 10 is 1:3. The low-grayscale subpixels L include the first low-grayscale subpixels L1, the second low-grayscale subpixels L2, and the third low-grayscale subpixels L3. In every adjacent N rows of the sub-pixels 101, the number of the high-grayscale subpixels H, the number of the first low-grayscale subpixels L1, the number of the second low-grayscale subpixels L2, and the number of the third low-grayscale subpixels L3 are equal to each other.

According to embodiments of the present disclosure, one relatively high grayscale and three relatively low grayscales (namely, the high-grayscale subpixel H, the first low-grayscale subpixel L1, the second low-grayscale subpixel L2, and the third low-grayscale subpixel L3) are used to replace one original grayscale, and the difference between the relatively high grayscale and the relatively low grayscales is further increased to further enhance viewing angle compensation. In addition, since the number of the high-grayscale subpixels H, the number of the first low-grayscale subpixels L1, the number of the second low-grayscale subpixels L2 and the number of the third low-grayscale subpixels L3 in each adjacent N rows of the sub-pixels 101 are equal, display brightness in every adjacent N rows of the sub-pixels 101 in the pixel group 10 become more uniform, thus alleviating the graininess of images and improving visual effect while enhancing viewing angel compensation.

In some embodiments of the present application, for a same original gray scale, grayscale values of the high-grayscale subpixels H, grayscale values of the first low-grayscale subpixels L1, grayscale values of the second low-grayscale subpixels L2 and grayscale values of the third low-grayscale subpixels L3 are different. For example, the grayscale values of the high-grayscale subpixels H are greater than grayscale values of the first low-grayscale subpixels L1, the grayscale values of the first low-grayscale subpixels L1 are greater than the grayscale values of the second low-grayscale subpixels L2, the grayscale values of the second low-grayscale subpixels L2 are greater than the grayscale values of the third low-grayscale subpixels L3.

As shown in FIG. 8, in every two adjacent rows of the sub-pixels 101 in the pixel group 10, the number of the high-grayscale subpixels H, the number of the first low-grayscale subpixels L1, the number of the second low-grayscale subpixels L2 and the number of the third low-grayscale subpixels L3 equal to each other. In each column of the sub-pixels 101, the number of the high-grayscale subpixels H, the number of the first low-grayscale subpixels L1, the number of the second low-grayscale subpixels L2, and the number of the second low-grayscale subpixels L2 are equal.

Therefore, in the pixel group 10, the distribution of the sub-pixels 101 in each column and every two adjacent rows is more uniform, thereby improving the uniformity of display brightness.

Furthermore, in the pixel group 10, the sub-pixels 101 in a same column are in a same color, and the sub-pixels 101 in a same row are arranged by repeating any combination of a red sub-pixel, a green sub-pixel, a blue sub-pixel. Then in every two rows of the sub-pixels 101 or every column of the sub-pixels 10, the numbers of the high-grayscale subpixels H, the numbers of first low-grayscale subpixels L1, the numbers of the second low-grayscale subpixels L2, and the numbers of the third low-grayscale subpixels L3 corresponding to the red sub-pixels are the same. Therefore, in this embodiment, the distribution of the high-grayscale subpixels H, the first low-grayscale subpixels L1, the second low-grayscale subpixels L2, and the third low-grayscale subpixels L3 corresponding to the red sub-pixels (or green sub-pixels, blue sub-pixels) is more uniform, so that the chromaticity uniformity can be obtained.

In one embodiment, the pixel group 10 includes the first pixel unit 11, the second pixel unit 12, the third pixel unit 13, and a fourth pixel unit 14. The first pixel unit 11 includes two high-grayscale subpixels H and one first low-grayscale subpixel L1. The second pixel unit 12 includes one high-grayscale subpixel H and two first low-grayscale subpixels L1. The third pixel unit 13 includes two second low-grayscale subpixels L2 and one third low-grayscale subpixel L3. The fourth pixel unit 14 includes one second low-grayscale subpixel L2 and two third low-grayscale subpixels L3. In the pixel group 10, the first pixel unit 11 and the second pixel unit 12 are arranged diagonally, and the third pixel unit 13 and the fourth pixel unit 14 are arranged diagonally.

Specifically, along the row direction, in the first pixel unit 11, the first low-grayscale subpixel L1 is located between two high-grayscale subpixels H. In the second pixel unit 12, the high-grayscale subpixel H is located between two first low-grayscale subpixels L1. In the third pixel unit 13, the third low-grayscale subpixel L3 is located between two second low-grayscale subpixels L2. In the fourth pixel unit 14, the second low-grayscale subpixel L2 is located between two third low-grayscale subpixels L3.

Figure 9:
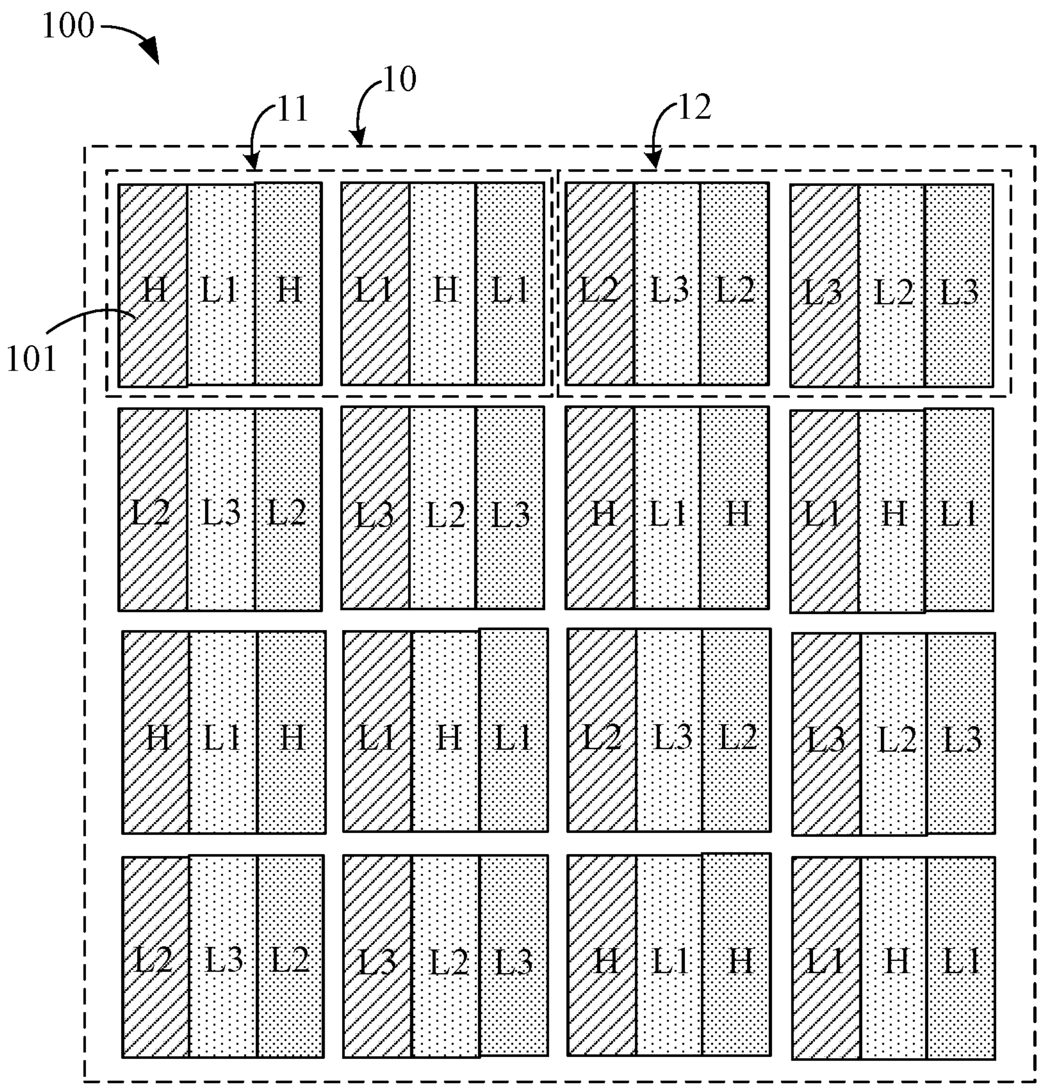
FIG. 9 is a schematic diagram of a sixth structure of the pixel arrangement structure according to the present disclosure.

Referring to FIG. 9, FIG. 9 is a schematic diagram of a sixth structure of the pixel arrangement structure according to the present disclosure. Difference from the pixel arrangement structure 100 shown in FIG. 8 lies in that in the embodiment of FIG. 9, in the pixel group 10, in each row of the sub-pixels 101, the number of the high-grayscale subpixels H, the number of the first low-grayscale subpixels L1, the number of the second low-grayscale subpixels L2, and the number of the third low-grayscale subpixels L3 are equal, and in every six adjacent columns of the sub-pixels 101, the number of the high-grayscale subpixels H, the number of the first low-grayscale subpixels L1, the number of the second low-grayscale subpixels L2, and the number of the third low-grayscale subpixels L3 are equal.

It can be understood that the grayscale values of the high-grayscale subpixels H, the grayscale values of the first low-grayscale subpixels L1, the grayscale values of the second low-grayscale subpixels L2, and the grayscale values of the third low-grayscale subpixels L3 are different. According to this embodiment, in each row of the sub-pixels 101, the number of the high-grayscale subpixels H, the number of the first low-grayscale subpixels L1, the number of the second low-grayscale subpixels L2, and the number of the third low-grayscale subpixels L3 are equal, therefore the distribution of the sub-pixels 101 in each column of the pixel group is more uniform, thereby improving the uniformity of display brightness, and alleviating the graininess of images.

Specifically, as shown in FIG. 9, in an embodiment, the pixel group 10 includes a plurality of first pixel units 11 and a plurality of second pixel units 12. Each of the first pixel units 11 and the second pixel units 12 is arranged in one row and six columns. In the first pixel unit 11, the high-grayscale subpixels H and the first low-grayscale subpixels L1 are alternately arranged. In the second pixel unit 12, the second low-grayscale subpixels L2 and the third low-grayscale subpixels L3 are alternately arranged. In the pixel group 10, in a same row of sub-pixels 101, the first pixel unit 11 and the second pixel unit 12 are alternately arranged. In a same row of the sub-pixels 101, the first pixel unit 11 and the second pixel unit 12 are alternately arranged.

It can be understood that in some embodiment, the grayscale values of the high-grayscale subpixels H are greater than grayscale values of the first low-grayscale subpixels L1, the grayscale values of the first low-grayscale subpixels L1 are greater than the grayscale values of the second low-grayscale subpixels L2, the grayscale values of the second low-grayscale subpixels L2 are greater than the grayscale values of the third low-grayscale subpixels L3. Then in the first pixel unit 11, brightness of the high-grayscale subpixels H and the brightness of the first low-grayscale subpixel L1 can neutralize with each other, and in the second pixel unit 12, brightness of the second low-grayscale subpixels L2 and the third low-grayscale subpixels L3 can neutralize with each other, thereby alleviating the graininess of images. And along the row direction and a column direction, the first pixel unit 11 and the second pixel unit 12 are alternately arranged, which further improves the brightness uniformity of the pixel group 10, thereby improving visual effect.

Figure 10:
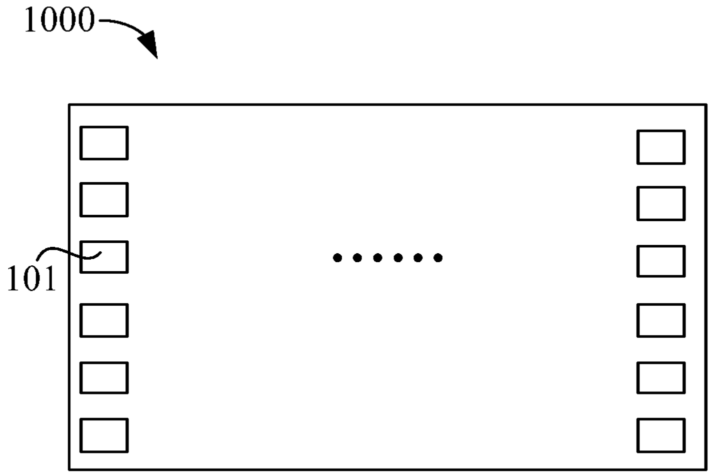
FIG. 10 is a schematic diagram of a display panel according to the present disclosure.

Accordingly, as shown in FIG. 10, the present disclosure also provides a display panel 1000. The display panel 1000 includes a plurality of sub-pixels 101. The plurality of sub-pixel 101 are arranged according to the pixel arrangement structure 100 described in any one of the above-mentioned embodiment. For details, please refer to the above-mentioned embodiment, which will not be repeated here.

In the display panel 1000 provided by the present disclosure, the sub-pixels 101 are arranged according to the pixel arrangement structure 100 described in any embodiment above, thus alleviating the graininess of images and improving visual effect while enhancing viewing angel compensation, and the quality of display panel 1000 can be improved.

The pixel arrangement structure and the display panel provided by the present disclosure have been introduced in detail above, and the description of the embodiments is merely intended to help understand the method and core ideas of the present application. At the same time, according to the idea of the present disclosure, there will be some changes in the specific implementation mode and application scope for those skilled in the art. From the above discussion, the content of this specification should not be understood as a limitation to the present disclosure.

What is claimed is:

1. A pixel arrangement structure comprising at least one pixel group, wherein the at least one pixel group comprises a plurality of sub-pixels arranged in an array and in three rows and nine columns, wherein a ratio of a number of high-grayscale subpixels in the sub-pixels to a number of low-grayscale subpixels in the sub-pixels is 1:2; the low-grayscale subpixels comprise a plurality of first low-grayscale subpixels and a plurality of second low-grayscale subpixels; among each row and each column of the sub-pixels, the number of the high-grayscale subpixels, a number of the first low-grayscale subpixels, and a number of the second low-grayscale subpixels are equal, respectively; and the at least one pixel group comprises a first pixel unit, a second pixel unit, and a third pixel unit arranged along a row direction; the first pixel unit comprises one of the high-grayscale subpixels, one of the first low-grayscale subpixels, and another one of the high-grayscale subpixels arranged sequentially along the row direction; the second pixel unit comprises one of the first low-grayscale subpixels, one of the second low-grayscale subpixels, and another one of the first low-grayscale subpixels arranged sequentially along the row direction; and the third pixel unit comprises one of the second low-grayscale subpixels, one of the high-grayscale subpixels, and another one of the second low-grayscale subpixels arranged sequentially along the row direction.

2. The pixel arrangement structure according to claim 1, wherein for a same original gray scale, grayscale values of the high-grayscale subpixels are greater than grayscale values of the first low-grayscale subpixels, and the grayscale values of the first low-grayscale subpixels are greater than grayscale values of the second low-grayscale subpixels.

3. The pixel arrangement structure according to claim 1, wherein in the at least one pixel group, the sub-pixels in a same column are in a same color, and the sub-pixels in a same row are arranged by repeating any combination of a red sub-pixel, a green sub-pixel, a blue sub-pixel.

4. The pixel arrangement structure according to claim 1, wherein the at least one pixel group comprises a plurality of first pixel units, a plurality of second pixel units, and a plurality of third pixel units; and each of each of the first pixel units, each of the second pixel units, and each of the third pixel units comprises a red sub-pixel, a green sub-pixel, and a blue sub-pixel.

5. A display panel comprising a pixel arrangement structure according to claim 1.

6. A pixel arrangement structure comprising at least one pixel group, wherein the at least one pixel group comprises a plurality of sub-pixels arranged in an array and in three rows and nine columns, wherein a ratio of a number of high-grayscale subpixels in the sub-pixels to a number of low-grayscale subpixels in the sub-pixels is 1:2; the low-grayscale subpixels comprise a plurality of first low-grayscale subpixels and a plurality of second low-grayscale subpixels; among each row and each column of the sub-pixels, the number of the high-grayscale subpixels, a number of the first low-grayscale subpixels, and a number of the second low-grayscale subpixels are equal, respectively; and the at least one pixel group comprises a first pixel unit, a second pixel unit, and a third pixel unit arranged along a row direction; the first pixel unit comprises three of the high-grayscale subpixels arranged sequentially along the row direction; the second pixel unit comprises three of the first low-grayscale subpixels arranged sequentially along the row direction; and the third pixel unit comprises three of the second low-grayscale subpixels arranged sequentially along the row direction.

7. The pixel arrangement structure according to claim 6, wherein for a same original gray scale, grayscale values of the high-grayscale subpixels are greater than grayscale values of the first low-grayscale subpixels, and the grayscale values of the first low-grayscale subpixels are greater than grayscale values of the second low-grayscale subpixels.

8. The pixel arrangement structure according to claim 6, wherein in the at least one pixel group, the sub-pixels in a same column are in a same color, and the sub-pixels in a same row are arranged by repeating any combination of a red sub-pixel, a green sub-pixel, a blue sub-pixel.

9. The pixel arrangement structure according to claim 6, wherein the at least one pixel group comprises a plurality of first pixel units, a plurality of second pixel units, and a plurality of third pixel units; and each of each of the first pixel units, each of the second pixel units, and each of the third pixel units comprises a red sub-pixel, a green sub-pixel, and a blue sub-pixel.

10. A pixel arrangement structure comprising at least one pixel group, wherein the at least one pixel group comprises a plurality of sub-pixels arranged in an array and in three rows and nine columns, wherein a ratio of a number of high-grayscale subpixels in the sub-pixels to a number of low-grayscale subpixels in the sub-pixels is 1:2; the low-grayscale subpixels comprise a plurality of first low-grayscale subpixels and a plurality of second low-grayscale subpixels; among each row and each column of the sub-pixels, the number of the high-grayscale subpixels, a number of the first low-grayscale subpixels, and a number of the second low-grayscale subpixels are equal, respectively; and the at least one pixel group comprises a first pixel unit, a second pixel unit, and a third pixel unit arranged along a row direction; the first pixel unit comprises one of the high-grayscale subpixels, one of the first low-grayscale subpixels, and one of the second low-grayscale sub-pixels arranged sequentially along the row direction; the second pixel unit comprises one of the first low-grayscale subpixels, one of the second low-grayscale subpixels, and one of the high-grayscale subpixels arranged sequentially along the row direction; and the third pixel unit comprises one of the second low-grayscale subpixels, one of the high-grayscale subpixels, and one of the first low-grayscale subpixels arranged sequentially along the row direction.

11. The pixel arrangement structure according to claim 10, wherein for a same original gray scale, grayscale values of the high-grayscale subpixels are greater than grayscale values of the first low-grayscale subpixels, the grayscale values of the first low-grayscale subpixels are greater than grayscale values of the second low-grayscale subpixels.

12. The pixel arrangement structure according to claim 10, wherein in the at least one pixel group, the sub-pixels in a same column are in a same color, and the sub-pixels in a same row are arranged by repeating any combination of a red sub-pixel, a green sub-pixel, a blue sub-pixel.

13. The pixel arrangement structure according to claim 10, wherein the at least one pixel group comprises a plurality of first pixel units, a plurality of second pixel units, and a plurality of third pixel units; and each of each of the first pixel units, each of the second pixel units, and each of the third pixel units comprises a red sub-pixel, a green sub-pixel, and a blue sub-pixel.

14. A pixel arrangement structure comprising at least one pixel group, wherein the at least one pixel group comprises a plurality of sub-pixels arranged in an array and in three rows and twelve columns;

wherein a ratio of a number of high-grayscale subpixels in the sub-pixels to a number of low-grayscale subpixels in the sub-pixels is 1:2; the low-grayscale subpixels comprise a plurality of first low-grayscale subpixels and a plurality of second low-grayscale subpixels; in one of three rows of the sub-pixels, the second low-grayscale subpixels and the high-grayscale subpixels are alternately arranged, in other two of the three rows of the sub-pixels, the number of the high-grayscale subpixels equals to a number of the second low-grayscale subpixels; among each column of the sub-pixels, the number of the high-grayscale subpixels, a number of a first low-grayscale subpixels, and the number of the second low-grayscale subpixels are equal;

the at least one pixel group comprises a plurality of first pixel units and a plurality of second pixel units, and both of the sub-pixels in each of the first pixel units and the subpixels in each of the second pixel units are arranged in one row and six columns;

and in each of the first pixel units, the high-grayscale subpixels and the first low-grayscale subpixels are alternately arranged, and in each of the second pixel units, the first low-grayscale subpixels and the second low-grayscale subpixels are alternately arranged; and A in a first row of three rows, the at least one pixel group comprises one of the first pixel units and one of the second pixel units arranged sequentially along a row direction; in a second row of the three rows, the second low-grayscale subpixels and the high-grayscale subpixels are alternately arranged, and in a third row of the three rows, the at least one pixel group comprises one of the second pixel units and one of the first pixel units arranged sequentially along the row direction.

15. The pixel arrangement structure according to claim 14, wherein for a same original gray scale, grayscale values of the high-grayscale subpixels are greater than grayscale values of the first low-grayscale subpixels, the grayscale values of the first low-grayscale subpixels are greater than grayscale values of the second low-grayscale subpixels.

16. The pixel arrangement structure according to claim 14, wherein in the at least one pixel group, the sub-pixels in a same column are in a same color, and the sub-pixels in a same row are arranged by repeating any combination of a red sub-pixel, a green sub-pixel, a blue sub-pixel.

17. The pixel arrangement structure according to claim 14, wherein both of each of the first pixel units and each of the second pixel units comprise a red sub-pixel, a green sub-pixel, and a blue sub-pixel.

18. A pixel arrangement structure comprising at least one pixel group, wherein the at least one pixel group comprises a plurality of sub-pixels arranged in an array and in four rows and twelve columns, wherein a ratio of a number of high-grayscale subpixels in the sub-pixels to a number of low-grayscale subpixels in the sub-pixels is 1:3; the low-grayscale subpixels comprise a plurality of first low-grayscale subpixels, a plurality of second low-grayscale subpixels, and a plurality of third low-grayscale subpixels; among each row and each adjacent six columns of the sub-pixels, the number of the high-grayscale subpixels, a number of the first low-grayscale subpixels, a number of the second low-grayscale subpixels, and a number of the third low-grayscale subpixels are equal, respectively;

the at least one pixel group comprises a plurality of first pixel units and a plurality of second pixel units; and in a first row and a third row of four rows, one of the first pixel units and one of the second pixel units are sequentially arranged along a row direction, respectively, and in a second row and a fourth row of the four rows, one of the second pixel units and one of the first pixel units are sequentially arranged along the row direction, respectively; and both of each of the first pixel units and each of the second pixel units are arranged in one row and six columns; and in the first pixel units, the high-grayscale subpixels and the first low-grayscale subpixels are alternately arranged, and in the second pixel units, the second low-grayscale subpixels and the third low-grayscale subpixels are alternately arranged.

19. The pixel arrangement structure according to claim 18, wherein for a same original gray scale, grayscale values of the high-grayscale subpixels are greater than grayscale values of the first low-grayscale subpixels, the grayscale values of the first low-grayscale subpixels are greater than grayscale values of the second low-grayscale subpixels, and the grayscale values of the second low-grayscale subpixels are greater than grayscale values of the third low-grayscale subpixels.

20. The pixel arrangement structure according to claim 18, wherein in the at least one pixel group, the sub-pixels in a same column are in a same color, and the sub-pixels in a same row are arranged by repeating any combination of a red sub-pixel, a green sub-pixel, a blue sub-pixel.

* * * * *